United States Patent
Tamura et al.

(10) Patent No.: US 11,066,969 B2
(45) Date of Patent: Jul. 20, 2021

(54) POSITIVE CRANKCASE VENTILATION SYSTEM

(71) Applicants: TOYOTA JIDOSHA KABUSHIKI KAISHA, Toyota (JP); TOYOTA BOSHOKU KABUSHIKI KAISHA, Kariya (JP)

(72) Inventors: Naoya Tamura, Toyota (JP); Hideto Morishita, Gifu (JP); Yoji Horiuchi, Kariya (JP); Naritsune Miyanaga, Toyota (JP)

(73) Assignees: Toyota Jidosha Kabushiki Kaisha, Toyota (JP); Toyota Boshoku Kabushiki Kaisha, Kariya (JP)

( * ) Notice: Subject to any disclaimer, the term of this patent is extended or adjusted under 35 U.S.C. 154(b) by 0 days.

(21) Appl. No.: 16/797,029

(22) Filed: Feb. 21, 2020

(65) Prior Publication Data
US 2020/0271027 A1    Aug. 27, 2020

(30) Foreign Application Priority Data
Feb. 26, 2019    (JP) .............................. JP2019-032648

(51) Int. Cl.
*F01M 13/04*    (2006.01)
*F01M 13/00*    (2006.01)
(52) U.S. Cl.
CPC .............................. *F01M 13/0011* (2013.01)

(58) Field of Classification Search
CPC .... F01M 13/04; F01M 13/0416; F01M 13/00; F01M 13/0405; F01M 11/03
See application file for complete search history.

(56) References Cited

U.S. PATENT DOCUMENTS

| | | | |
|---|---|---|---|
| 2010/0059013 A1* | 3/2010 | Narayanakumar | .......................... F01M 13/0416 123/195 C |
| 2019/0017420 A1* | 1/2019 | Kashiwabara | ......... F01M 13/04 |
| 2019/0316500 A1* | 10/2019 | Miyanaga | .......... F01M 13/0011 |

FOREIGN PATENT DOCUMENTS

| | | | |
|---|---|---|---|
| JP | 2010-121537 | | 6/2010 |
| JP | 2010121537 A | * | 6/2010 |
| JP | 2012-188942 | | 10/2012 |

* cited by examiner

*Primary Examiner* — Long T Tran
(74) *Attorney, Agent, or Firm* — Finnegan, Henderson, Farabow, Garrett & Dunner, LLP

(57) ABSTRACT

A positive crankcase ventilation system includes a positive crankcase ventilation valve, a coupling part, and a plate member. The coupling part is configured to couple the positive crankcase ventilation valve and an internal combustion engine. The plate member is attached to the coupling part on an opposite side from a side where the coupling part and the internal combustion engine contact each other. A portion of the plate member is bent in a direction toward a base of a hose insertion port provided on the positive crankcase ventilation valve, and another portion of the plate member is bent in a direction toward a side wall of an attachment portion of the positive crankcase ventilation valve provided on the coupling part.

4 Claims, 5 Drawing Sheets

POSITIVE CRANKCASE VENTILATION SYSTEM

CROSS-REFERENCE TO RELATED APPLICATION

This application claims priority to Japanese Patent Application No. 2019-032648 filed on Feb. 26, 2019, incorporated herein by reference in its entirety.

BACKGROUND

1. Technical Field

The present disclosure relates to a positive crankcase ventilation system.

2. Description of Related Art

It has been known that a head cover is attached to an upper end of a cylinder head as one of components of an internal combustion engine. In addition, various techniques for preventing detachment of a positive crankcase ventilation (PCV) valve from the head cover or an oil separator have been proposed (for example, see Japanese Patent Application Publication No. 2010-121537 (JP 2010-121537 A) for the above).

SUMMARY

However, in regard to the above-described techniques, the PCV valve can be detached from the head cover or the like in a state where a PCV hose connected to the PCV valve is detached from the PCV valve. That is, the PCV valve can be detached when the above condition is satisfied. Thus, it is not always difficult to detach the PCV valve.

The present disclosure provides a PCV system in which detachment of a PCV valve is difficult.

A PCV system according to an aspect of the present disclosure includes a PCV valve, a coupling part, and a plate member. The coupling part is configured to couple the PCV valve and an internal combustion engine. The plate member is attached to the coupling part on an opposite side from a side where the coupling part and the internal combustion engine contact each other. A portion of the plate member is bent in a direction toward a base of a hose insertion port provided on the PCV valve, and another portion of the plate member is bent in a direction toward a side wall of an attachment portion of the PCV valve provided on the coupling part.

With the PCV system according to the aspect of the present disclosure, it is possible to make detachment of the PCV valve difficult.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

A description will hereinafter be made on modes for carrying out the present disclosure with reference to the drawings.

First Embodiment

Figure 1A:
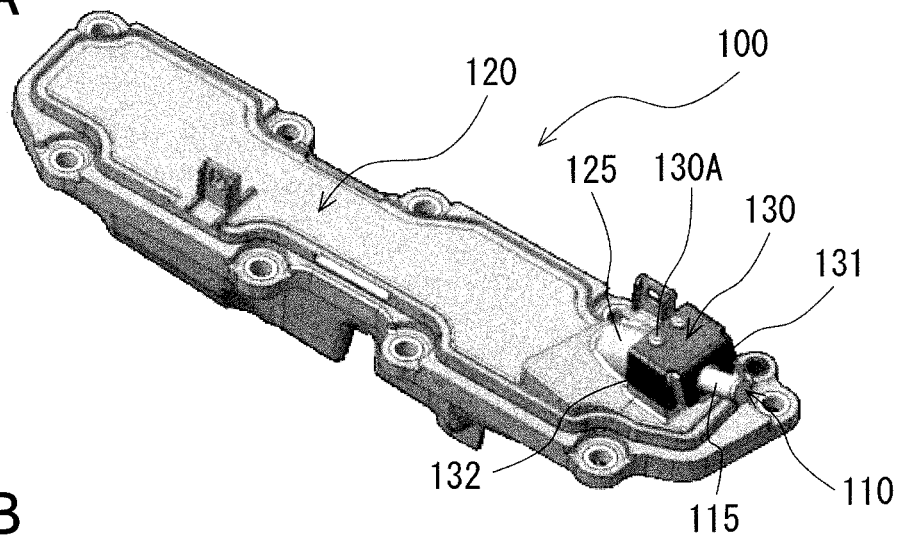
FIG. 1A is an example of a perspective view of a PCV system according to a first embodiment.
Figure 1B:
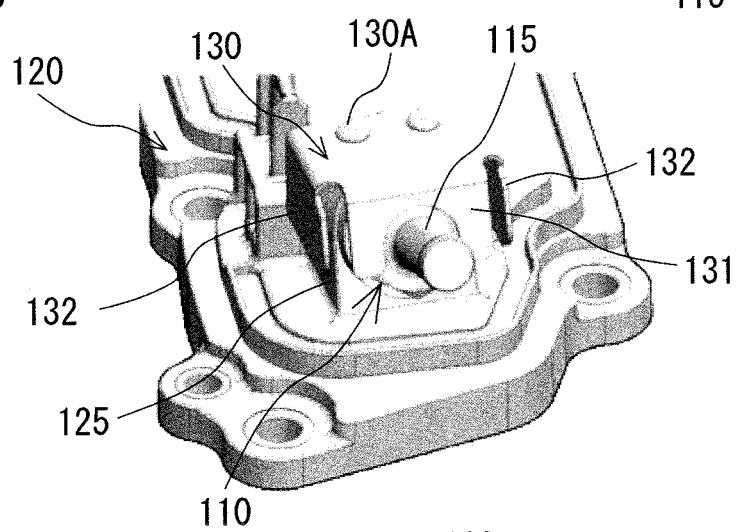
FIG. 1B is an example of an enlarged perspective view of a portion of the PCV system according to the first embodiment.
Figure 1C:
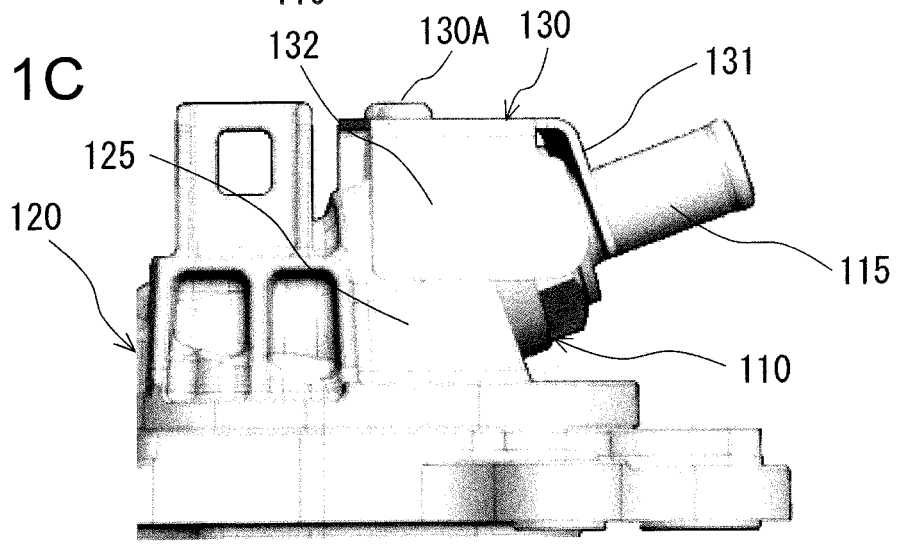
FIG. 1C is an example of an enlarged side view of a portion of the PCV system according to the first embodiment.
Figure 2:
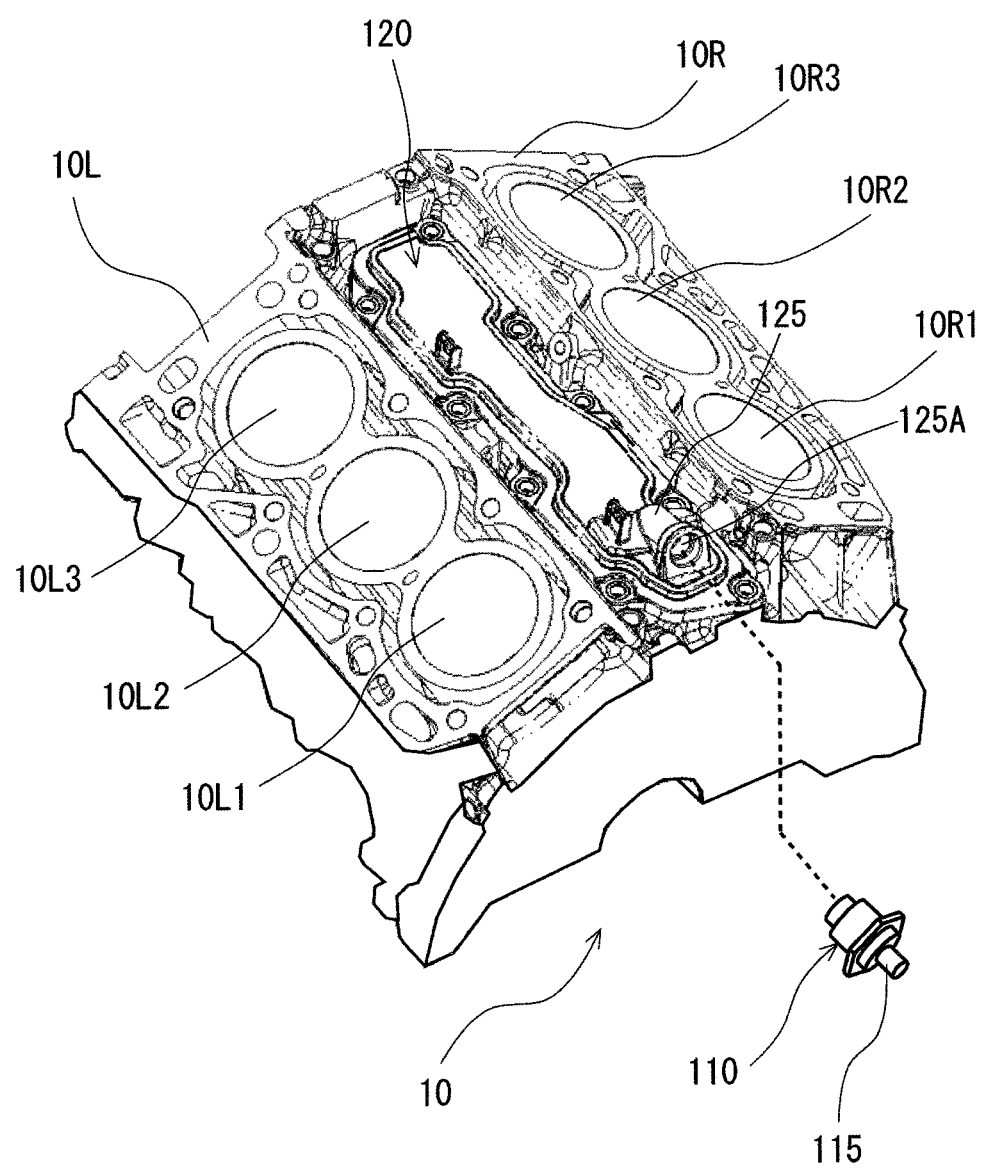
FIG. 2 is an example of a perspective view of a cylinder block.

FIG. 1A is an example of a perspective view of a PCV system 100 according to a first embodiment. FIG. 1B is an example of an enlarged perspective view of a portion of the PCV system 100 according to the first embodiment. FIG. 1C is an example of an enlarged side view of a portion of the PCV system 100 according to the first embodiment. FIG. 2 is an example of a perspective view of a cylinder block 10. In FIG. 2, the cylinder block 10 is partially illustrated.

As illustrated in FIG. 1A to FIG. 1C, the PCV system 100 includes a PCV valve 110, a PCV separator 120, and a plate member (hereinafter referred to as a plate) 130. The PCV separator 120 is also referred to as an oil separator, an oil separation device, and the like. As illustrated in FIG. 2, the PCV separator 120 is attached to the cylinder block 10 that is one of components constituting an engine (for example, a V turbo engine or the like).

More specifically, at a position between left bank 10L and a right bank 10R of the cylinder block 10, the PCV separator 120 is fastened thereto by bolts. The left bank 10L includes three cylinders 10L1, 10L2, 10L3. The right bank 10R includes three cylinders 10R1, 10R2 and 10R3. That is, the PCV separator 120 is attached between the six cylinders 10L1, 10L2, 10L3, 10R1, 10R2 and 10R3, which are arranged in two rows to form a V-shape.

As illustrated in FIG. 2, the PCV valve 110 illustrated in FIGS. 1A to 1C is attached to an attachment hole 125A of a valve attachment section 125 provided at one end in a longitudinal direction of the PCV separator 120. That is, the PCV separator 120 serves as a coupling part that couples the PCV valve 110 and the cylinder block 10. As illustrated in FIGS. 1A to 1C, a hose insertion port 115 is provided on a front surface of the PCV valve 110. One end of the PCV hose (not illustrated) is attached to the hose insertion port 115. The other end of the PCV hose is connected to an intake system of the cylinder block 10. Blow-by gas, which is separated from oil, flows through the PCV hose.

The plate 130 illustrated in FIGS. 1A to 1C is attached to the valve attachment section 125 of the PCV separator 120. More specifically, on an opposite side from a side where the PCV separator 120 and the cylinder block 10 contact each other, the plate 130 is welded to the valve attachment section 125 from above by a weld member 130A. A material for the plate 130 is desirably metal. However, the material for the plate 130 may be a resin such as reinforced plastic containing glass fiber.

Here, as illustrated in FIGS. 1A to 1C, a portion 131 of the plate 130 in a direction toward the hose insertion port 115 is bent in a direction toward a base of the hose insertion port 115. The portion 131 corresponds to a leg portion of the plate 130 that is in a T-shape before being bent. More specifically, the portion 131 is bent such that the hose insertion port 115 is positioned within a cutout portion provided in the portion 131. The thus-bent portion 131 of the plate 130 prevents detaching of the PCV valve 110 from the valve attachment section 125. In particular, since the plate 130 is welded to the valve attachment section 125, a possibility that the plate 130 is detached from the valve attachment section 125 is low. Thus, a possibility that the plate 130 is detached from the valve attachment section 125 and the PCV valve 110 is detached from the valve attachment section 125 is also low.

Meanwhile, as illustrated in FIGS. 1A to 1C, another portion 132 of the plate 130 is bent in a direction toward a side wall of the valve attachment section 125. The other portion 132 corresponds to both hand portions of the plate 130 that is in the T-shape before being bent. More specifically, the other portion 132 is bent in such a manner as to cover the valve attachment section 125. The thus-bent other portion 132 of the plate 130 protects both of the side walls of the valve attachment section 125. Thus, it is difficult to detach the PCV valve 110 from the valve attachment section 125 by breaking the plate 130, which is welded to the valve attachment section 125, and the weld member 130A using a tool.

In the case where the plate 130 has the T-shape, as illustrated in FIGS. 1A to 1C, a clearance is possibly provided between the portion 131 and the other portion 132 of the plate 130. However, as long as various types of cost, such as processing cost and manufacturing cost, are acceptable, the other portion 132 desirably has an outer shape without such a clearance. Even in the case where the clearance is provided, the other portion 132 desirably has an outer shape without a clearance through which the tool capable of breaking the plate 130 cannot be inserted.

Next, a description will be made on a comparative example of the first embodiment with reference to FIG. 3.

Figure 3:
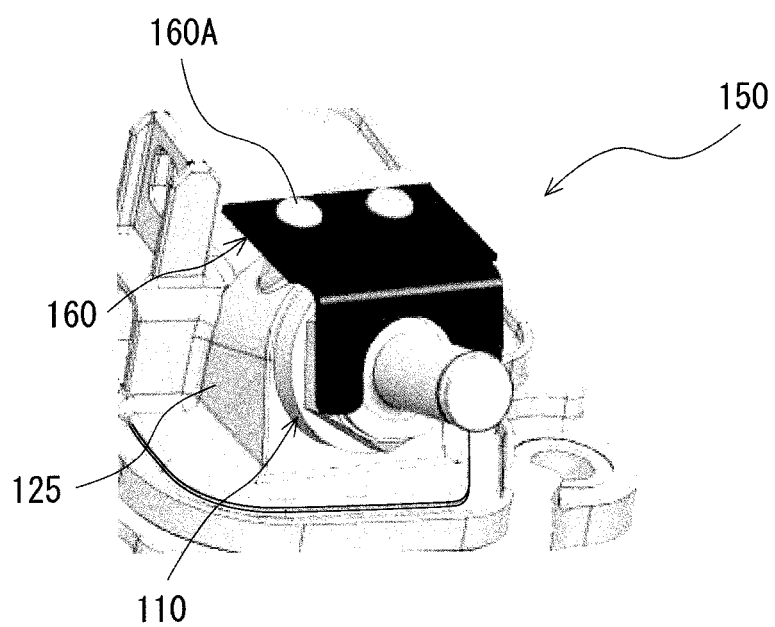
FIG. 3 is an example of a partial perspective view of a PCV system according to a comparative example.

FIG. 3 is an example of a partial perspective view of a PCV system 150 according to the comparative example. As illustrated in FIG. 3, a plate 160 of the PCV system 150 has an I-shape and does not include a portion corresponding to the above-described other portion 132. In such a case, the valve attachment section 125 is not protected. Thus, there is a possibility that the tool is inserted between the plate 160 and the PCV valve 110 or between the plate 160 and the valve attachment section 125 and breaks the plate 160 or a weld member 160A of the plate 160. Just as described, there is a possibility that the PCV valve 110 in the PCV system 150 according to the comparative example is detached. On the contrary, as described above, in the PCV system 100 according to the first embodiment, the possibility that the PCV valve 110 is detached can be reduced when compared to the comparative example.

As it has been described so far, the PCV system 100 according to the first embodiment includes the PCV valve 110, the PCV separator 120, and the plate 130. The PCV separator 120 couples the PCV valve 110 and the cylinder block 10. On the opposite side from the side where the PCV separator 120 and the cylinder block 10 contact each other, the plate 130 is attached to the PCV separator 120 from above. In particular, the portion 131 of the plate 130 is bent in the direction toward the base of the hose insertion port 115, which is provided on the PCV valve 110. In addition, the other portion 132 of the plate 130 is bent in the direction toward the side wall of the valve attachment section 125 in the PCV valve 110, which is provided in the PCV separator 120. Therefore, it is possible to make the detachment of the PCV valve 110 difficult.

Second Embodiment

Figure 4:
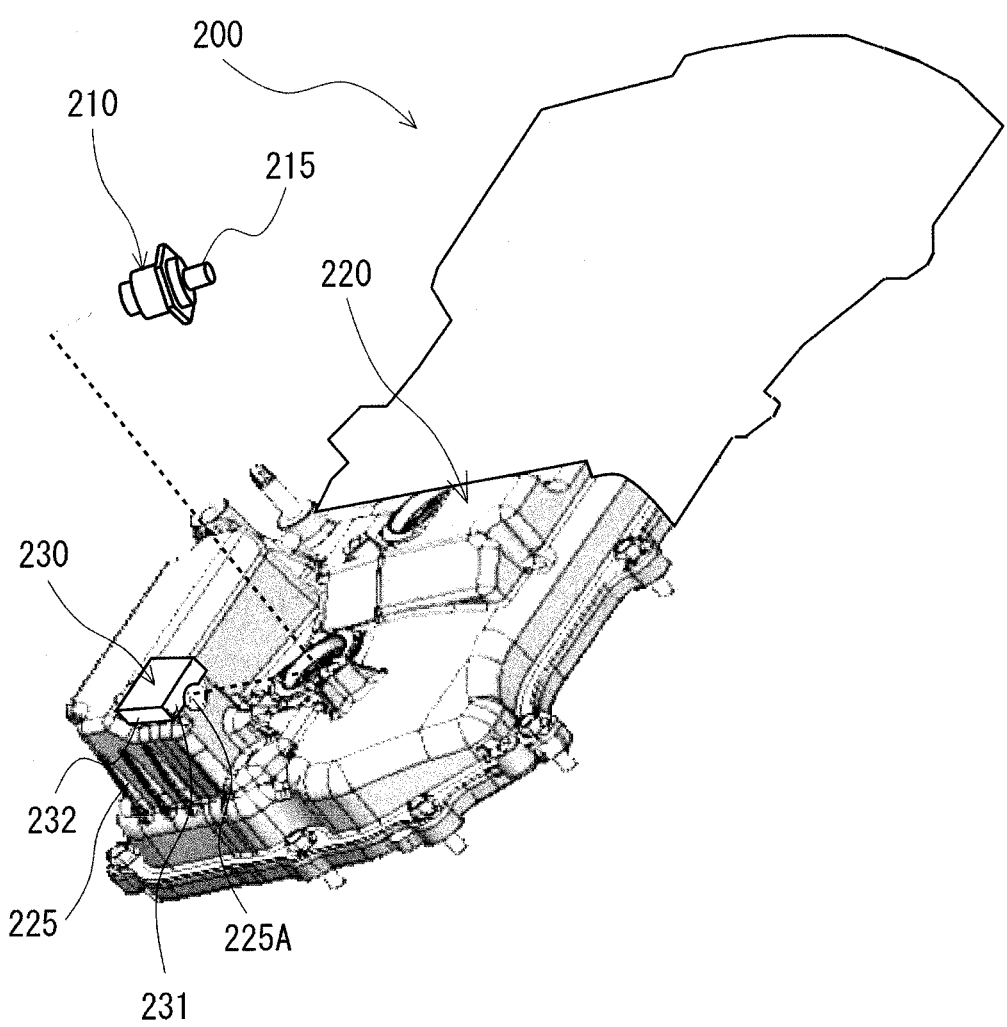
FIG. 4 is an example of a perspective view of a PCV system according to a second embodiment.

Next, a description will be made on a second embodiment of the present disclosure with reference to FIG. 4. FIG. 4 is an example of a perspective view of a PCV system 200 according to the second embodiment. As illustrated in FIG. 4, the PCV system 200 includes a PCV valve 210, a head cover 220, and a plate 230. The PCV valve 210 and the plate 230 are basically the same as the PCV valve 110 and the plate 130, which have been described in the first embodiment, respectively. In FIG. 4, the head cover 220 is partially illustrated.

The head cover 220 is attached to a cylinder head (not illustrated) that is placed on an upper end of the left bank 10L (see FIG. 2) of the cylinder block 10. The cylinder head is also one of the components constituting the engine. The head cover 220 may be attached to the cylinder head (not illustrated) that is placed on an upper end of the right bank 10R (see FIG. 2) of the cylinder block 10.

As illustrated in FIG. 4, the PCV valve 210 is attached to an attachment hole 225A of a PCV separator section 225 provided at one end in a longitudinal direction of the head cover 220. That is, the head cover 220 serves as a coupling part that couples the PCV valve 210 and the cylinder head, and the PCV separator section 225 serves as an attachment portion for the PCV valve 210. As illustrated in FIG. 4, a hose insertion port 215 is provided on a front surface of the PCV valve 210. As described in the first embodiment, the one end of the PCV hose is attached to the hose insertion port 215.

The plate 230 is attached to the PCV separator section 225 of the head cover 220. More specifically, on an opposite side from a side where the head cover 220 and the cylinder head contact each other, the plate 230 is welded to the PCV separator section 225 from above. Similar to the plate 130, a portion 231 and another portion 232 of the plate 230 are bent. Thus, a possibility that the PCV valve 210 is detached from the PCV separator section 225 is low. In addition, it is difficult to forcibly detach the PCV valve 210 from the PCV separator section 225 by breaking the plate 230, which is welded to the PCV separator section 225, and the like using the tool.

As it has been described so far, the PCV system 200 according to the second embodiment includes the PCV valve 210, the head cover 220, and the plate 230. The head cover 220 couples the PCV valve 210 and the cylinder head. On the opposite side from the side where the head cover 220 and the cylinder head contact each other, the plate 230 is attached to the head cover 220 from above. In particular, the portion 231 of the plate 230 is bent in a direction toward a base of the hose insertion port 215, which is provided on the PCV valve 210. In addition, the other portion 232 of the plate 230 is bent in a direction toward a side wall of the PCV separator section 225 in the PCV valve 210, which is provided in the head cover 220. Therefore, it is possible to make the detachment of the PCV valve 210 difficult.

Third Embodiment

Figure 5A:
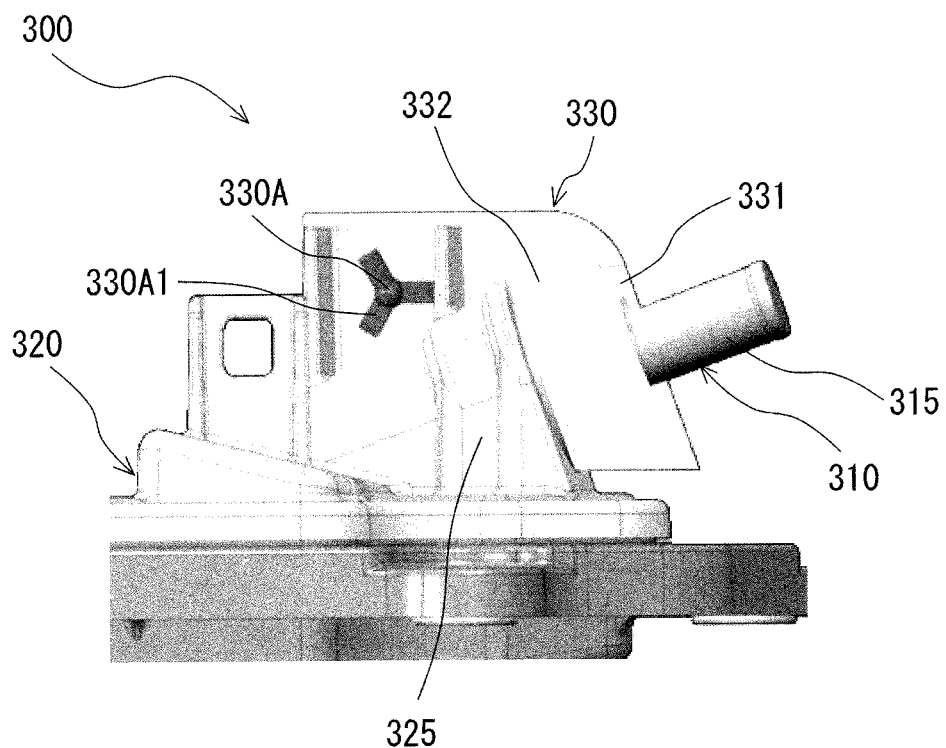
FIG. 5A is an example of an enlarged perspective view in which a portion of a PCV system according to a third embodiment is cut.
Figure 5B:
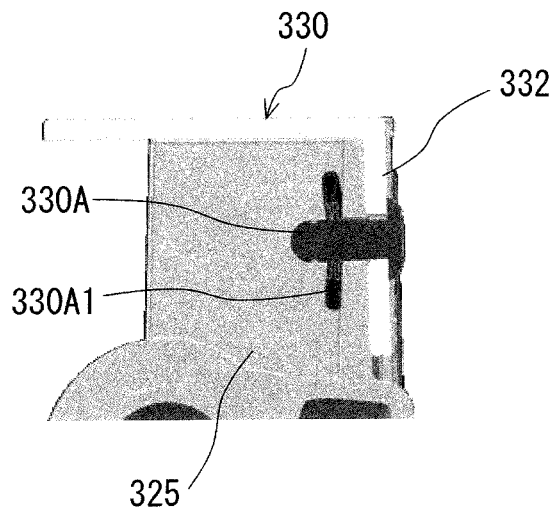
FIG. 5B is a schematic view illustrating a cross-section of the cutout portion of the PCV system.

Next, a description will be made on a third embodiment of the present disclosure with reference to FIG. 5. FIG. 5A is an example of an enlarged perspective view in which a portion of a PCV system 300 according to the third embodiment is cut. FIG. 5B is a schematic view illustrating a cross-section of the cutout portion of the PCV system 300. As illustrated in FIG. 5A, the PCV system 300 includes a PCV valve 310, a PCV separator 320, and a plate 330. The PCV valve 310 and the PCV separator 320 are basically the same as the PCV valve 110 and the PCV separator 120, which have been described in the first embodiment, respectively.

Similar to the first embodiment and the second embodiment, a portion 331 of the plate 330 in a direction toward a hose insertion port 315 is bent in a direction toward a base of the hose insertion port 315. More specifically, the portion 331 is bent such that the hose insertion port 315 is inserted in an opening portion provided in the portion 331. The thus-bent portion 331 of the plate 330 prevents detaching of the PCV valve 310 from a valve attachment section 325. Another portion 332 of the plate 330 is bent in a direction toward a side wall of the valve attachment section 325. More specifically, the other portion 332 is bent in such a manner as to cover the valve attachment section 325. The thus-bent other portion 332 of the plate 330 protects both of the side walls of the valve attachment section 325.

While the description has been made on welding as the example in the first embodiment and the second embodiment, in the third embodiment, on an opposite side from a side where the PCV separator 320 and the cylinder block 10 (see FIG. 2) contact each other, the plate 330 is attached to the valve attachment section 325 obliquely from above and is caulked and fixed to the valve attachment section 325 by a rivet pin 330A. When a development section 330A1 of the rivet pin 330A is developed, it becomes difficult to easily detach the plate 330 from the valve attachment section 325. As a result of this, a possibility that the plate 330 is detached from the valve attachment section 325 and the PCV valve 310 is detached from the valve attachment section 325 is also low. In addition, the third embodiment differs from the first embodiment in a point that a clearance is not provided between the portion 331 and the other portion 332 of the plate 330. In this way, it is possible to prevent insertion of the tool that can break the plate 330.

As it has been described so far, the PCV system 300 according to the third embodiment includes the PCV valve 310, the PCV separator 320, and the plate 330. The PCV separator 320 couples the PCV valve 310 and the cylinder block 10. On the opposite side from the side where the PCV separator 320 and the cylinder block 10 contact each other, the plate 330 is attached to the PCV separator 320 obliquely from above. In particular, the portion 331 of the plate 330 is bent in the direction toward the base of the hose insertion port 315, which is provided on the PCV valve 310. In addition, the other portion 332 of the plate 330 is bent in the direction toward the side wall of the valve attachment section 325 in the PCV valve 310, which is provided in the PCV separator 320. Therefore, it is possible to make the detachment of the PCV valve 310 difficult.

The detailed description has been made so far on the preferred embodiments of the present disclosure. The embodiment that can be applied is not limited to any of such particular embodiments, and various modifications and changes can be made thereto within the scope of the gist of the present disclosure described in the claims.

What is claimed is:

1. A positive crankcase ventilation system comprising:
a positive crankcase ventilation valve;
a coupling part that couples the positive crankcase ventilation valve and an internal combustion engine; and
a plate member that is attached to the coupling part on an opposite side of the coupling part from a side of the coupling part where the coupling part and the internal combustion engine contact each other, a portion of the plate member being bent in a direction toward a base of a hose insertion port provided on the positive crankcase ventilation valve, and another portion of the plate member being bent in a direction toward a side wall of an attachment portion of the positive crankcase ventilation valve provided on the coupling part.

2. The positive crankcase ventilation system according to claim 1, wherein the portion of the plate member and the another portion of the plate member each comprise a flat plate member, and the another portion of the plate member comprises two side portions overlapping opposite side walls of the attachment portion.

3. The positive crankcase ventilation system according to claim 1, wherein the plate member comprises a flat plate member welded to the coupling part.

4. The positive crankcase ventilation system according to claim 1, wherein the plate member comprises a flat plate member riveted to the coupling part.

* * * * *